United States Patent [19]

Baldwin et al.

[11] 4,316,223
[45] Feb. 16, 1982

[54] RECORDING OF DIGITAL SIGNALS

[76] Inventors: John L. E. Baldwin, 65 Lakewood Rd., Chandlers Ford, Eastleigh, Hampshire; John G. S. Ive, 22 Radley Lodge, 25 Inner Pk. Rd., London SW19, both of England

[21] Appl. No.: 128,861

[22] Filed: Mar. 10, 1980

Related U.S. Application Data

[63] Continuation-in-part of Ser. No. 923,973, Jul. 12, 1978, abandoned.

[30] Foreign Application Priority Data

Jul. 14, 1977 [GB] United Kingdom ............... 29691/77

[51] Int. Cl.³ ............................................... G11B 5/09
[52] U.S. Cl. ......................................... 360/39; 360/48
[58] Field of Search ....................... 360/39, 48, 49, 33, 360/38, 22, 64

[56] References Cited

U.S. PATENT DOCUMENTS

| | | | |
|---|---|---|---|
| 4,041,453 | 8/1977 | Umeda et al. | 360/39 |
| 4,063,284 | 12/1977 | Tatami | 360/38 |
| 4,134,131 | 1/1979 | Hopkins, Jr. | 360/33 |

*Primary Examiner*—Vincent P. Canney
*Attorney, Agent, or Firm*—Laubscher, Philpitt & Laubscher

[57] ABSTRACT

Digital recording and reproducing apparatus is disclosed for recording digital signals in such a manner as to conceal errors contained therein, including a write address generator for storing incoming digital signals in a first sequence in a memory, and a read address generator for causing the signals to be read out from the memory in a second sequence different from the first sequence. A control device selectively connects the write address generator and the read address generator sequentially to the memory, whereby the digital signals read out from the memory may be recorded on a recording medium.

14 Claims, 5 Drawing Figures

FIG. I

|  | A | | B | |
|---|---|---|---|---|
|  | Normal Binary | | Scrambled Binary | |
| Decimal | ab | cde | edc ab | Decimal |
| 0 | 00 | 000 | 000 00 | 0 |
| 1 | 00 | 001 | 100 00 | 16 |
| 2 | 00 | 010 | 010 00 | 8 |
| 3 | 00 | 011 | 110 00 | 24 |
| 4 | 00 | 100 | 001 00 | 4 |
| 5 | 00 | 101 | 101 00 | 20 |
| 6 | 00 | 110 | 011 00 | 12 |
| 7 | 00 | 111 | 111 00 | 28 |
| 8 | 01 | 000 | 000 01 | 1 |
| 9 | 01 | 001 | 100 01 | 17 |
| 10 | 01 | 010 | 010 01 | 9 |
| 11 | 01 | 011 | 110 01 | 25 |
| 12 | 01 | 100 | 001 01 | 5 |
| 13 | 01 | 101 | 101 01 | 21 |
| 14 | 01 | 110 | 011 01 | 13 |
| 15 | 01 | 111 | 111 01 | 29 |
| 16 | 10 | 000 | 000 10 | 2 |
| 17 | 10 | 001 | 100 10 | 18 |
| 18 | 10 | 010 | 010 10 | 10 |
| 19 | 10 | 011 | 110 10 | 26 |
| 20 | 10 | 100 | 001 10 | 6 |
| 21 | 10 | 101 | 101 10 | 22 |
| 22 | 10 | 110 | 110 10 | 14 |
| 23 | 10 | 111 | 111 10 | 30 |
| 24 | 11 | 000 | 000 11 | 3 |
| 25 | 11 | 001 | 100 11 | 19 |
| 26 | 11 | 010 | 010 11 | 11 |
| 27 | 11 | 011 | 110 11 | 27 |
| 28 | 11 | 100 | 001 11 | 7 |
| 29 | 11 | 101 | 101 11 | 23 |
| 30 | 11 | 110 | 011 11 | 15 |
| 31 | 11 | 111 | 111 11 | 31 |

FIG. 2.

RECORDING OF DIGITAL SIGNALS

This application is a continuation-in-part of Ser. No. 923,973, filed July 12, 1978 and now abandoned.

BACKGROUND OF THE INVENTION

The present invention relates to the recording and playing back of digital signals, and in particular to a method of and apparatus for recording digital signals in such a manner that errors in the signals can be concealed.

SUMMARY OF THE INVENTION

According to the invention there is provided recording apparatus for recording digital signals comprising means for receiving incoming digital signals, memory means for storing the incoming digital signals and connected to the receiving means, write address generator means for causing the incoming digital signals to be stored in the memory means in a first sequence, read address generator means for causing the digital signals in the memory means to be read out from the memory means in a second sequence different to the first, control means for selectively sequentially connecting the write address generator means and the read address generator means to the memory means, and recording means connected to the memory means for recording the digital signals read out from the memory on to a recording medium.

BRIEF DESCRIPTION OF THE DRAWINGS

Features and advantages of the present invention will be apparent from the following description of an embodiment thereof given by way of example with reference to the accompanying drawings, in which:

FIG. 2 shows an address code used in the apparatus shown in FIG. 1;

DETAILED DESCRIPTION

A preferred embodiment of the present invention will now be described in relation to its use as a video signal recorder using magnetic tape.

When digital video signals are recorded on magnetic tape, errors such as tape "drop-outs" can occur. Dropouts usually arise due to a speck of dust or a blemish on the tape causing the recording or play-back head to separate from the tape. Due to the relative head-to-tapespeeds, which are of the order of 1,500 inches per second, the frequency of occurrence of drop-outs, of average duration 3 micro seconds, would be 10 to 100 per minute. Errors can also occur due to spurious signals.

The digital signals are recorded in the form of words which may consist of a plurality of bits, e.g. 3 or more bits. The words are recorded in such a manner that the information used to generate a replacement word comes from parts of the tape sufficiently remote from an error so that there is negligible correlation between the incidence of dropouts on the parts of the tape considered.

One apparatus for generating replacement words is shown in the copending Baldwin application Ser. No. 864,002 filed Dec. 23, 1977, which was abandoned in favor of the allowed continuation application Ser. No. 46,267 filed June 7, 1979.

For some purposes when utilizing composite coding, it may be sufficient or even desirable to treat adjacent words as pairs and to treat each pair as an entity hereinafter called a word assembly; this would be satisfactory for sampling at twice sub-carrier frequency. For sampling at "n" times sub-carrier frequency, word assemblies containing no more than "n" consecutive words can be handled as single entities without significantly affecting the effectiveness of error concealment. Component coding may also be used with luminance words and chrominance words time multiplexed together.

The method to be described utilizes a memory to store the incoming digital words, the memory being read in a manner different to the manner in which incoming words are written into the memory so that the incoming words are recorded in groups on the tape in such a manner that adjacent incoming words or word assemblies are put in different groups.

Figure 1:
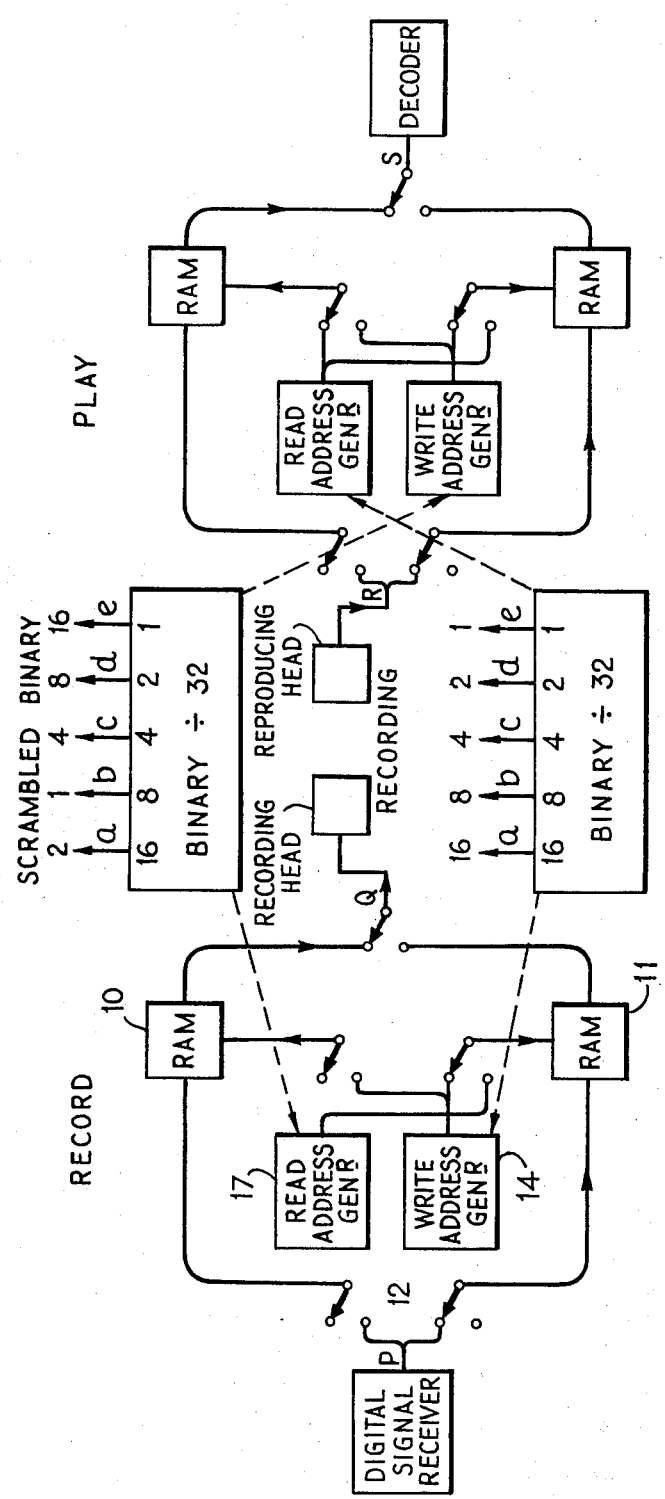
FIG. 1 shows a block diagram form of recording and reproducing apparatus for digital signals.
Figure 3:
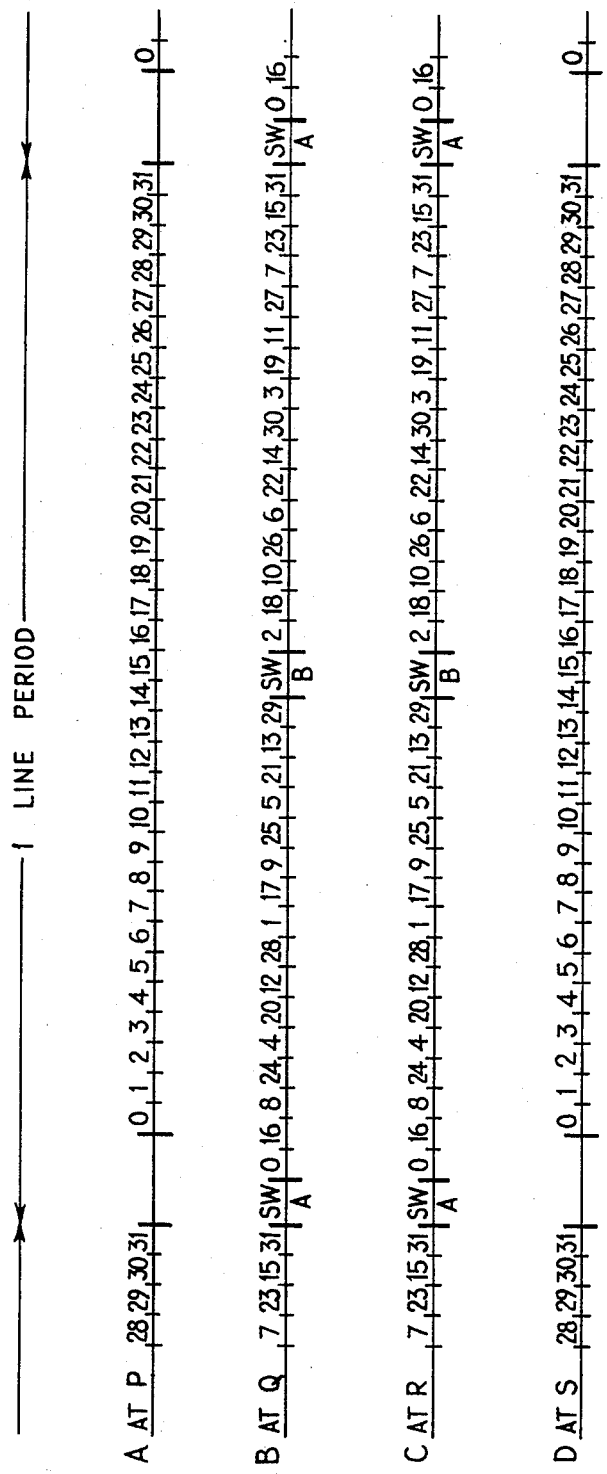
FIG. 3 shows the positioning of various words at selected points in the apparatus shown in FIG. 1.

Referring now to the drawings and in particular to FIGS. 1 and 3, for the particular scaling used in FIG. 1 to 3 it is assumed that each line of a television picture is made up of 32 data words together with various control words. In practice it is expected that each line will be made up of 512 words or even 1024 words. The data words are initially separated into blocks, the blocks being separated by "start" sequences represented by SW in FIG. 3 which are inserted at the appropriate time using start sequence generator means (see FIG. 4). In this embodiment, a block may be a complete line of a T.V. picture or it may be only a part of a line. Further, it is convenient if adjacent blocks are of the same size. In the embodiment, the digital words representing a line of a T.V. picture are separated into two blocks and each block being preceded by at least one start sequence. From FIG. 3 it will be seen that the first block is considered to be of 16 words is preceded by a start sequence A while the second block is preceded by a start sequence B. It is necessary to differentiate between start words. This can be done by using different start sequences, as in FIG. 3, but it can also be done in other ways such as recognizing their time of occurrence. From the above, it will be seen that there will be at least one start sequence per line of a T.V. picture but in fact, it is thought that there will be 4 start words per line.

Incoming digital words are presented via a gating device shown in the form of a switching device 12 to one of two memory devices 10,11 using a data bus. The memory devices are preferably random access memories (RAM's). Although switching devices have been shown, it will be appreciated that in practice the same operation will be achieved by enabling the inputs to the various devices at the appropriate times. The words representing a whole line are assigned to one RAM by the device 12 and as one line is being written into one RAM, the previously recorded line is being read out of the other RAM. With the switches as shown in FIG. 1, as each word is written into the memory 11, it is assigned an address which is in normal binary notation and shown in column A of FIG. 2 by a write address generator 14 which may conveniently take the form of a conventional binary dividing circuit, in this case a ÷32 circuit (as shown schematically by the block 36).

When recording the words on tape, in this embodiment adjacent incoming words are recorded in such a manner that they are spaced apart on the tape. This is achieved by reading the digital words out of the memory in an appropriate order. It has been found that the read address generator 17 can utilize a convention binary dividing circuit (illustrated schematically by the block 46) with transposed outputs as shown in FIG. 1 to produce a scrambled binary signal which is applied to the memory 10 to read out the immediately previous line to that being written into the memory 11. The transposition of outputs is shown in FIG. 1 and the resultant order of reading out and recording of words is shown in FIG. 3 and column B of FIG. 2.

Switch 12,13 and 18 in the form of gates or data selectors control which of the RAM's is in a write mode and which of the RAM's is in a read mode. Thus, with the switches in the positions shown in FIG. 1 the RAM 10 is in a read mode and the RAM 11 in a write mode.

The present embodiment utilizes ÷32 units 36,46 as the read and write address generators. The actual division ratio is determined by the number of digital words in a line of a T.V. picture and so if a greater or lesser number of digital words compose a line then an appropriate alteration will have to be made to the read and write address generators 14a and 17a.

After recording the tape may be played back using a reverse technique to that described above. This is clearly shown at the bottom of FIG. 3. The play read address generator is identical to the record write address generator 14 and the play write address generator is identical to the record read address generator 17.

Although the record write address generator and the play read address generator use normal binary numbering on this embodiment, it will be obvious to those skilled in the art, that although this makes the operation more easily understood it is not in any way essential. The scrambled binary could be used for the record write address generator with the normal binary used for the record read address generator. Further, both the record read and write address generators could use specially chosen words.

The embodiment described above works satisfactorily when there are $2^n$ words in a block. In other cases, the scrambling of the binary addresses of the memories by interchanging the outputs from binary counters is likely to be unsatisfactory and a programmed read only memory will be needed for scrambling.

It will be noted that the sampling of the analogue waveform into the digital words has not been described. This is because it is felt that the techniques and apparatus involved are well known to those skilled in the art. Further, it is expected that in the near future, the analogue to digital conversion will be done prior to the information being received at the tape recorder, for example directly at the camera.

In FIG. 1, recording and reproducing apparatus is shown as having memories and read and write control apparatus for the recording part with separate memories and read and write control apparatus for the reproducing part. In practice, in some circumstances, the same memories and read and write control apparatus can be used but with an altered connection pattern in the recording mode from that in the reproducing mode. In other words, in the recording mode, the memories and read and write control apparatus are connected as shown in the left of the drawings whereas in the reproducing mode, the memories and the read and write control apparatus are connected as shown in the right of the drawing.

Figure 4:
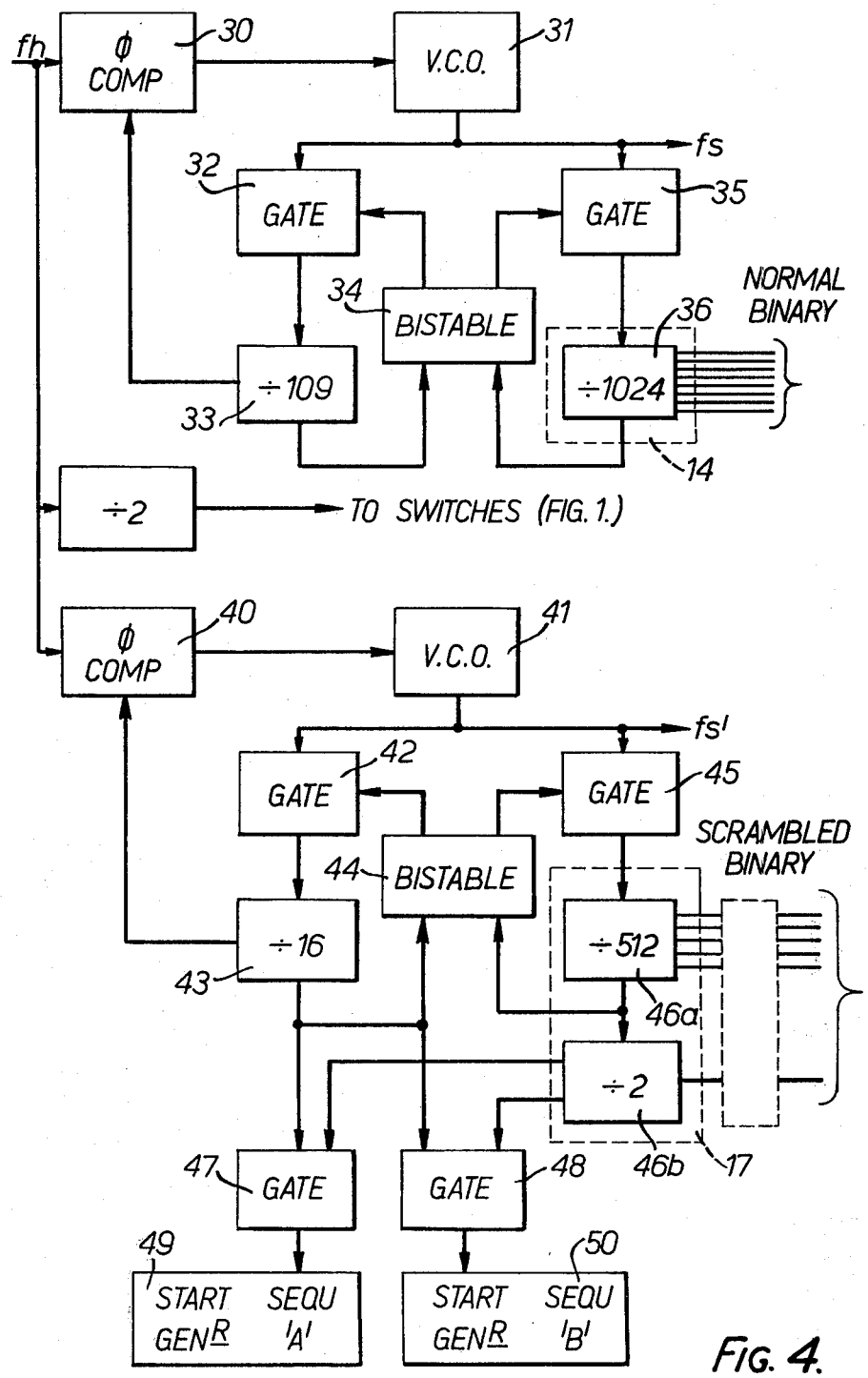
FIG. 4 shows in more detail one way of implementing the record side of FIG. 1.
Figure 5:
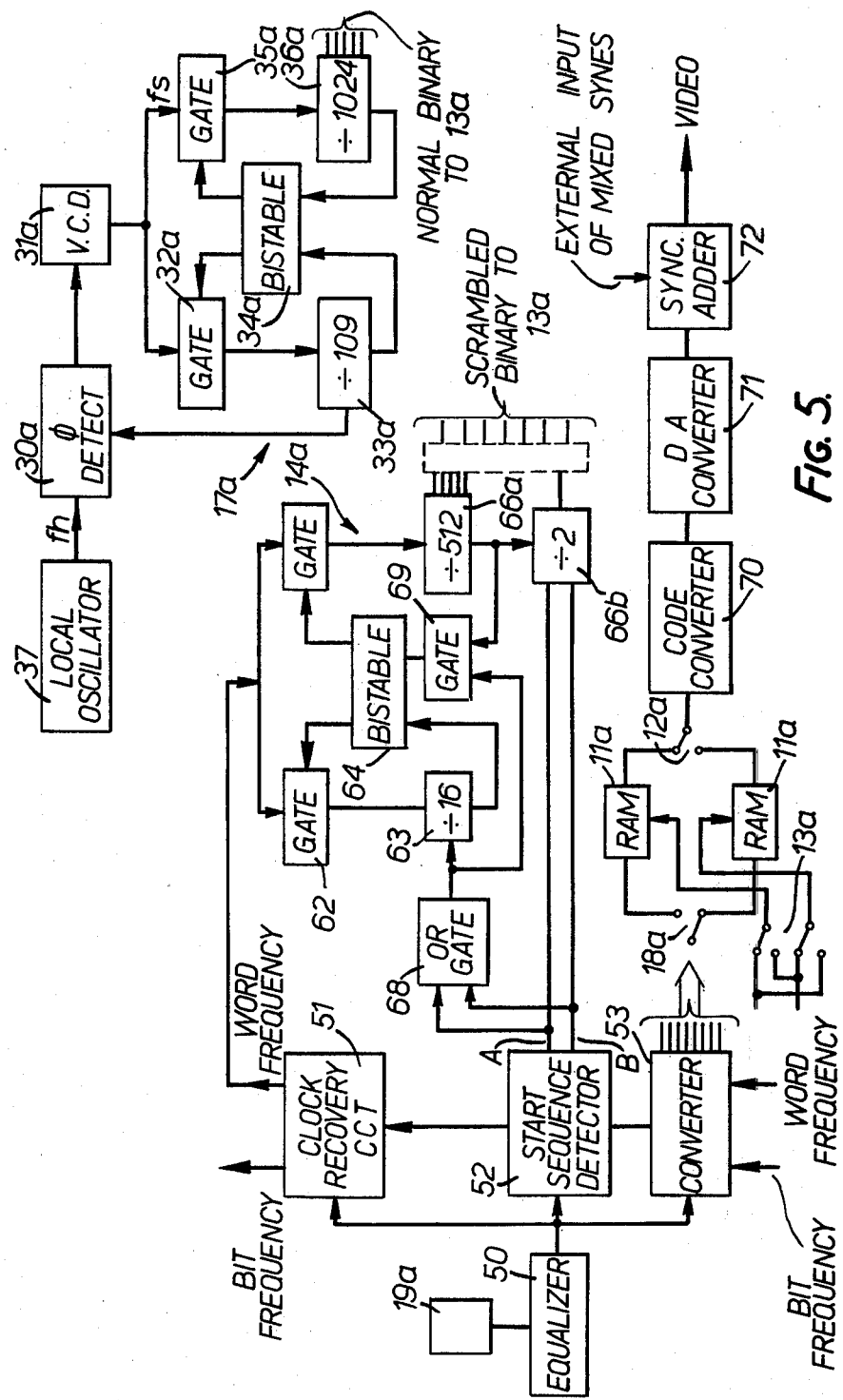
FIG. 5 shows in more detail one way of implementing the replay side of FIG. 1.

In order that the invention be clearly understood and may be put into practice, reference will now be made to FIGS. 4 and 5 which show more clearly the circuit arrangements for controlling recording and replay respectively. In FIGS. 4 and 5 it has been assumed that there will be 1024 samples per line of T.V. video, i.e., a sampling rate nominally of four times the frequency of the chrominance subcarrier of a PAL T.V. signal (4 Fsc). Such a sampling frequency would, it is belived, in practice, require the signals to be recorded using two channels but for simplicity it has been assumed that only a single channel is required.

Before describing FIGS. 4 and 5 in detail, it must be remembered that each line of a PAL T.V. signal occupies 64 $\mu$secs of which the first 12 $\mu$secs is a line blanking interval and the remaining 52 $\mu$secs is the active picture interval. Sampling at 4 fsc means that not only is the whole active picture interval sampled but a portion of the line blanking interval is also sampled. There is, however, a portion of the line blanking interval which is available for synchronizing and other purposes.

Turning now to FIG. 4, this shows in more detail the arrangement for controlling the record side of FIG. 1. Line frequency signals are separated from the incoming video signal and are used to control the write address generator 14, the read address generator 17 and the switches 12, 13 and 18.

The control of the write address generator 14 will now be described. Line frequency signals fh, e.g., line syncs, are fed to a phase comparator circuit 30 whose output is fed to a voltage controlled oscillator 31 which provides the sampling frequency Fs. The output of the oscillator 31 is fed via a gate 32 to a dividing circuit 33 whose operation repeats every 1135 counts to provide a first output fed back to the phase comparator circuit 30 where the phase of the oscillator 31 is compared with the phase of the line frequency signals and if they are not in phase the oscillation frequency is altered slightly under the control of the output of the phase comparator 30. This is a well known technique.

The circuit 33 determines the length of time available for synchronizing the sampling frequency. In this case the length of time is equivalent to 109 words after which time a further output is generated which is fed to a bistable circuit 34 which has two outputs, the first of which is used to control the gate 32 and the second of which is used to control a further gate 35. The gates 35 and 32 are arranged such that when one is open the other is closed. The gate 35 has an input which receives output pulses from the oscillator 31 and when the circuit 33 has completed 109 counts and signalled this to the bistable circuit 34, the circuit 34 caused gate 32 to be closed and gate 35 to be opened thus transferring counting of the output signals from the oscillator 31 from the circuit 33 to a binary counter 36 which constitutes the write address generator 14. The counter 36 in this case is a divide-by-1024 circuit, i.e. it produces an output after 1024 counts which output is fed to the bistable circuit 34 to control it to repeat the synchronising and counting procedure for the next line of video. The counter 36 also has normal binary outputs and these are connected to the rams via the switches 13. In this case the binary outputs from the circuit 36 are normal i.e. they are not scrambled.

Control of the switches 12, 13 and 18 is very simple because they are arranged to be simple two position devices and hence a divide-by-2 circuit 49 fed with line frequency signals e.g. line synch pulses suffices to produce the control signals for the switches 12, 13 and 18.

The control of the read address generator 17 and the way in which start sequences are inserted in the data stream for recording will now be described with reference to the bottom portion of FIG. 4. Again line frequency signals are used to synchronize the output from an oscillator and since the basic circuit is similar in operation to that already described above in relation to the write address generator it is thought that no detailed explanation of the operation of the circuit including the components 40 to 46 will be necessary since the same components have been given a similar reference numeral but increased by 10. Suffice to say that the circuit 43 which is similar in operation to the circuit 33 is of a different value i.e. it is a divide-by-16 counter rather than a divide-by-109 counter. The value of the counter 43 determines the maximum length of time available for a start sequence and in this case it is equivalent to 16 counts at the sampling frequency. Further, the counter 46 which constitutes the read address generator 17 is shown as comprising two counting circuits namely a divide-by-512 counter 46a whose "carry" output is fed to a divide-by-2 counter 46b. Also, the oscillator 41 runs at a frequency $fs^1$ which is lower than fs.

The divide-by-2 counter 46b has two functions. The first is to produce a binary output which together with binary outputs from the counter 46a constitute the read addresses which are fed via the switch 13 to one or other of the memories 10,11. These outputs are scrambled as indicated in FIG. 1. The second function is to control gates 47,48 which are also fed from the "carry" output of the counter 43 to determine which of the start sequence generators 49,50 is energized.

The overall operation of the read address circuit is thus that for the first 16 counts of the oscillator 41 a start sequence from say the generator 49 is fed on to the data bus for recording. Immediately thereafter, and for the next 512 counts data stored in one of the memories 10,11 is read out and fed on to the data bus for recording. The data is fed on to the data bus from the generator 49 and from the memory 10 or 11 as a series of words with the bits of each word in parallel. It is therefore necessary to feed the series of words into a latch operating at word frequency (i.e. sampling frequency) and from there through a parallel to series converter to the recording read. This is a well established technique.

Once 512 words have been read out of the memory 11 or 12, the circuit resets and counts a further 16 counts of the output of the oscillator 41 during which time the other start sequence generator 50, is energized, and the second start sequence is fed on to the data bus. The two start sequences may be identical but it is preferable if they are different as it enables the replay apparatus to be simplified. After these 16 counts have taken place, the next 512 words are read out of the memory 10 or 11 under the control of the counters 46a and 46b. This then completes the reading out of the data relating to one complete line of video and produces a sequence equivalent to that shown at B in FIG. 3. The circuit is now ready to read information relating to the next line from the other memory when the next line frequency signal is received.

If an analogue signal is being fed to the apparatus the output of the oscillator 31 is used to control the sampling of the analogue waveform for analogue to digital conversion.

It is apparent from the above that the reading and writing operations are conducted at the rates determined by the frequency of the oscillators 31,41 but the word sequence is different. Preferably, the rates are different so that the reading and start sequence insertion operations is conducted at a lower rate than the writing operations so as to reduce the recorded bit rate.

The replay side of the apparatus will now be described in more detail with reference to FIGS. 1 and 5.

The signal recorded on the tape is reproduced by the reproducing head 19a and fed via an equalizer circuit 50. From the circuit 50 there are three parallel outputs one to each of a clock recovery circuit 51, a start sequence detector circuit 52 and a series to parallel converter circuit 53 for the data.

The clock recovering circuit is a conventional circuit and responds to the bit rate of the incoming data to produce a bit frequency signal. It includes a counter for deriving a word frequency signal from the bit frequency signal. These two signals are used to control the clocking of the write address apparatus. Synchronization is achieved during replay by detecting the start sequences rather than by detecting line frequency signals as is done at the record side. Thus, if start sequence detector produces an indication of whether it has directed a start sequence SWA from the generator 49 (indicating the beginning of a line of video) or a start sequence SWB from the generator 50 (indicating the middle of a line or video). In either case the write address circuitry to be described later is enabled in the appropriate manner. A suitable start sequence detector is more fully disclosed in the Thirwall et al U.S. Pat. No. 4,266,271 issued Aug. 28, 1979.

The series to parallel converter circuit 53 is triggered by a signal from the start sequence detector circuit 52 and accepts incoming serial bits and assembles them into a series of words under the control of the bit frequency and word frequency signals recovered from the data stream. These digital words are then fed to the data selector switch 18a (FIG. 1) for feeding to one or other of the memories 10a and 11a (FIG. 1) and are equivalent to signal C in FIG. 3.

The write address generator circuitry will now be described in detail. As stated above, this is synchronized by the detection of either the start sequence SWA or the start sequence SWB. Otherwise, the circuitry is rather similar to the read address circuitry shown at the bottom of FIG. 4 and the equivalent reference numerals but raised by 20 have been used for equivalent parts. However, the word frequency signal which is counted by the counters 63, and 66 is the word frequency signal derived by the clock recovery circuit 51. The operation is also slightly different in that when a start sequence is detected, a divide-by-2 circuit 66b which constitutes part of the counter 66 which is actually the write address generator 14a of FIG. 1 is preset to a condition depending on whether it is the start sequence SWA or the sequence SWB which is detected. Further, the divide-by-16 circuit 63 is also preset by the output of a OR gate 68 so as to be enabled for counting when either of the start sequence is detected.

To ensure proper operation, the output of the divide-by-512 circuit 66a constituting the other part of the counter 66 is gated with the output of the OR gate in a further gate 69 so that counting by the circuit 63 will only take place where there is an output from the OR gate 68 and an output from the circuit 66a.

Thus, in overall operation, on detection of a start sequence SWA the counter 63 is preset and counts the word frequency signal for 16 counts which removes the start sequence from the data stream. Thereafter, the gate 62 is closed, the gate 65 is opened and the counter 66 counts 512 counts of the word frequency signal. It is to be remembered that the binary outputs of the counters 66a and 66b are scrambled in an identical manner to those of the counters 46a and 46b so that data words from the output of the series to parallel converter circuit are fed to "scrambled" addresses of one of the memories 10a, 11a depending on the position of the switch 13a.

After 512 words have been written into one of the memories e.g. memory 11a, there is an output from the counter 66a and when the start sequence SWB is detected the gates 62 and 63 are operated and the counter 63 starts to count for 16 clock periods of the word frequency to remove the start sequence SWB from the data stream thereafter the next 512 words are fed into memory 11a at "scrambled" addresses. Thus there are now 1024 words constituting one complete line of video in the memory 11a. This is then read out on receipt of the next start sequence SWA when the switches 18a, 13a and 12a change over.

The read address generation circuit which is shown in FIG. 5 is identical to the write address generator circuit shown on the upper part of FIG. 3 and is therefore identified by the same reference numerals with the letter a added. It is supplied with locally produced line frequency pulses in order to remove "jitter" from the recorded signal. The local oscillator for the read address generator may be periodically triggered by a jitter free line synch so removing jitter from the recovered picture. The head wheel and capstan servos have to be appropriately locked as is well known in the art. The read addresses are in normal binary so that the data stream now looks like that shown at D in FIG. 3.

If the digital data was encoded prior to recording the data is now fed through a code converter 70 where it is put back into its original form prior to being reconverted to analogue in a digital to analogue converter 71. Thereafter sync pulses are added to the analogue signal in a sync adder circuit 72 fed with externally produced mixed sync pulses. The output is then suitable for display on a T.V. receiver.

It will be appreciated that the switches 18a, 13a and 12a operate in an identical manner to switches 18, 13 and 12 but are controlled by a divide-by-2 circuit responsive to detection of the start sequence SWA.

Various modifications may be made to the apparatus described above. For example, in the above embodiments it is stated that the digital words recorded on the magnetic tape are in a sequence which is different to the sequence of words at the input of the respective memory means and this implies that there is only one change of sequence between generation of the words and recording of the words. This need not necessarily be the case. It is possible to generate digital words in a first sequence, write them into the memory in a second sequence different to the first and read them out of the memory in a third sequence different to both the first or second sequence. The latter can be achieved by transposition of the outputs of both the read and write address generators or by the use of alternative RAM's especially when there are not $2^n$ words. On replay the sequences are reversed.

What is claimed is:

1. Apparatus for recording digital signals in the form of words comprising
   (a) means for receiving incoming digital signals;
   (b) memory means (10,11) connected with said receiving means;
   (c) write address generator means (14) for causing the incoming digital signals to be stored in said memory means in the form of words in a first sequence;
   (d) read address generator means (17) for causing the digital signals in said memory means to be read out from said memory means in a second sequence different from the first sequence, said read and write address generator means each including dividing circuits (40,42) each having a divisor which is a function of the number of digital signals in a block of said signals;
   (e) control means for selectively connecting said write address generator means and said read address generator means sequentially to said memory means; and
   (f) recording means connected with said memory means for recording on a given medium the digital signals read out from said memory.

2. Recording apparatus according to claim 1, wherein one of the dividing circuits has its outputs transposed.

3. Recording apparatus according to claim 1 wherein one of the read and write address generators further includes a read only memory.

4. Recording apparatus according to claim 1, wherein the memory means comprises two memory devices, the control means being arranged to connect the write address generator to one of the memory devices while the read address generator is connected to the other of the memory devices.

5. Digital recording and reproducing apparatus, comprising,
   (a) means for receiving incoming digital signals;
   (b) record memory means (10,11) connected with said receiving means;
   (c) record write address generator means (14) for causing the incoming digital signals to be stored in the memory means in word form in a first sequence;
   (d) record read address generator means for causing the digital words in said memory means to be read out from the memory means in a second sequence different to the first, said write address and read address generator means each including a divider circuit having a divisor that is a function of the number of digital words in a block thereof;
   (e) recording means for recording the signals on a medium;
   (f) reproducing means for reproducing the signals recorded on medium;
   (g) reproduce memory means connected with said reproducing means for storing the digital signals reproduced from the record medium;
   (h) reproduce with address generator means for causing the reproduced digital signals to be stored in the reproduce memory means in said second sequence;
   (i) reproduce read address generator means for causing the digital signals in said reproduce memory means to be read out from said memory means in said first sequence, said reproduce write address and read address generator means each including a divider circuit having a divisor that is a function of the number of digital words in a block thereof; and (j) control means for selecting one of the read or reproduce modes of operation.

6. Digital recording and reproducing apparatus according to claim 5 wherein one of the dividing circuits has its outputs transposed.

7. Digital recording and reproducing apparatus according to claim 5 wherein at least one of the read and write address generators further includes a read only memory.

8. Digital recording and reproducing apparatus according to claim 5 wherein the memory means comprises two memory devices, the control means being arranged to connect the write address generator to one of the memory devices while the read address generator is connected to the other of the memory devices.

9. Digital recording and reproducing apparatus according to claim 5, wherein the record memory means also constitutes the reproduce memory means; said control means altering the connections to the record memory means of the record and reproduce read and write address generators depending on the mode of operation of the apparatus.

10. Digital recording and reproducing apparatus according to claim 9, wherein the record write address generator constitutes the reproduce read address generator and the record read address generator constitutes the reproduce write address generator when the apparatus is in the reproduce mode of operation.

11. Playback apparatus for reproducing digital signals recorded on a recording medium, comprising means for generating digital signals from the signals recorded on the recording medium memory means for storing the incoming digital signals and connected to the receiving means, write address generator means for causing the incoming digital signals to be stored in the memory means in a first sequence, read address generator means for causing the digital signals in the memory means to be read out from the memory means in a second sequence different to the first, each of said read and write address generator means including a dividing circuit having a divisor which is a function of the number of digital signals in a block of said signals, control means for selectively sequentially connecting the write address generator means and the read address generator means to the memory means, and decoding means connected to the memory means for decoding the digital signals read out from the memory means.

12. Apparatus for recording a digital signal in the form of digital words, comprising
    (a) means for receiving an incoming digital signal in the form of digital words in a first sequence;
    (b) memory means (10, 11) connected with said receiving means;
    (c) write address generator means (14) for causing the incoming digital signals to be stored in said memory means in the form of words in a second sequence;
    (d) read address generator means (17) for causing the digital signals in said memory means to be read out from said memory means in a third sequence different from the first sequence;
    (e) control means for selectively connecting said write address generator means and said read address generator means sequentially to said memory means; and
    (f) recording means connected with said memory means for recording on a given medium the digital signals read out from said memory;
    (g) each of said read and write address generator means including at least one dividing circuit (40, 42) having a divisor which is a function of the number of digital signals in a block of said signals.

13. Recording apparatus according to claim 12 wherein the first sequence is the same as the second sequence.

14. Recording apparatus according to claim 12 wherein at least one of the read and write address generators further includes a read only memory.

* * * * *